July 22, 1952  V. J. PALMER  2,604,446
WATER CONDITIONING DEVICE
Filed Sept. 19, 1949
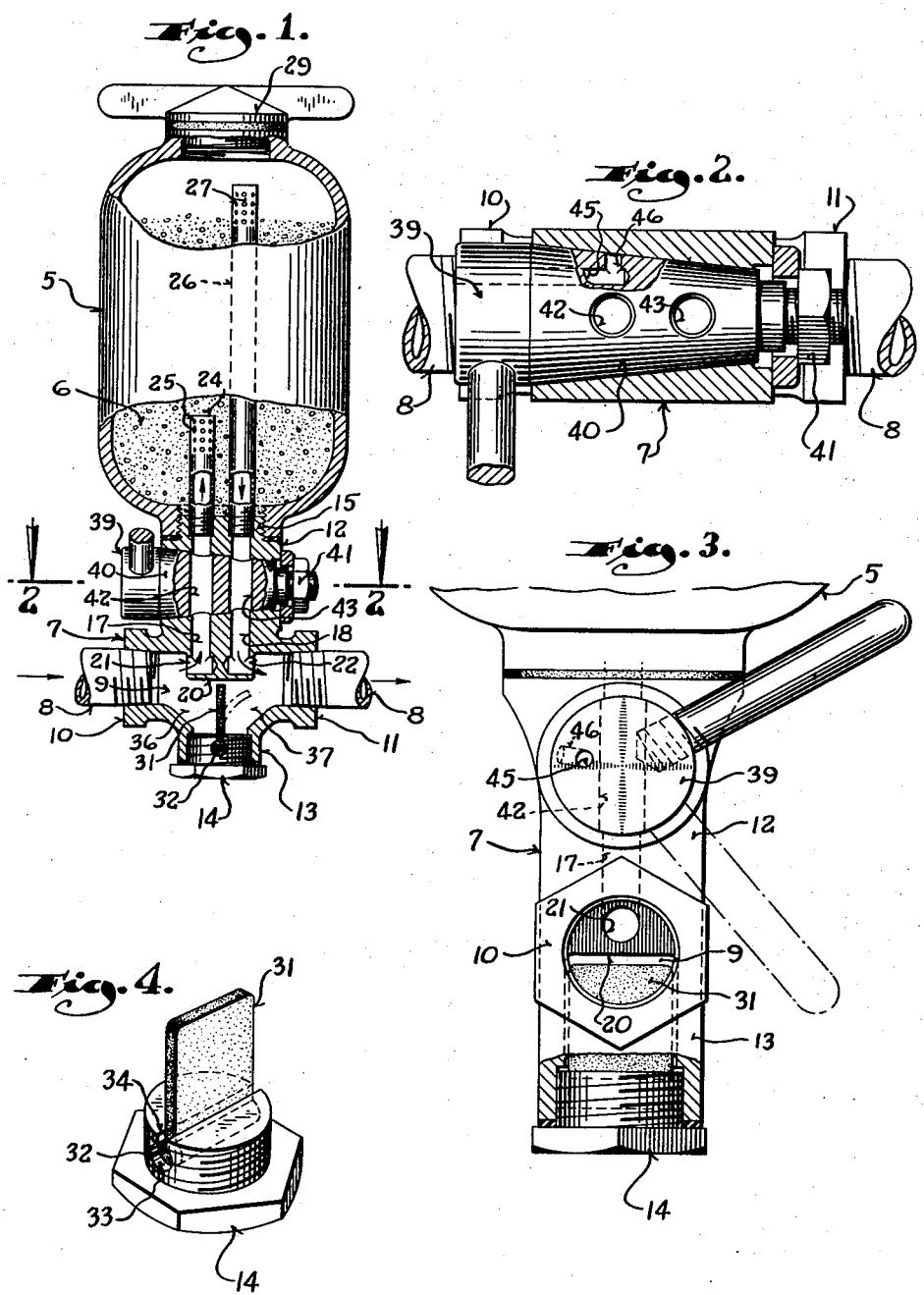
Inventor.
Vernon J. Palmer Patented July 22, 1952

2,604,446

UNITED STATES PATENT OFFICE 2,604,446

WATER CONDITIONING DEVICE

Vernon J. Palmer, Milwaukee, Wis., assignor to Bruner Corporation, Milwaukee, Wis., a corporation of Wisconsin Application September 19, 1949, Serial No. 116,472

1 Claim. (Cl. 210—31)

This invention relates to water conditioning systems and refers more particularly to a water conditioning device by which water may be treated chemically.

In certain types of water conditioning systems, it is customary to connect in parallel flow relationship with a water feeder line a receptacle or pot containing a chemical or chemicals to be used for treating the water. With such systems, some of the water flowing in the feeder line by-passes the chemical pot while the remaining portion of the water is caused to enter the pot through the inlet passage thereof to be chemically treated by its flow through the chemicals contained in the pot. The treated water, of course, is returned to the water feeder line through the outlet passage of the pot, at a point downstream from the mouth of the inlet passage, and serves to conduct chemicals from the pot to the water by-passing the pot.

In the past, a portion of the water flowing through the feeder line was caused to enter the pot by means of a fixed restriction incorporated in the feeder line between the inlet and the outlet of the pot. Normally, this restriction caused sufficient pressure differential to be established in the feeder line as to effect diversion of a portion of the water from the line into the inlet passage of the pot.

However, since the afore-mentioned restriction was invariably fixed, there was no assurance that any of the water in the feeder line would be diverted into the pot during conditions of very low flow rates in the feeder line, with the result that none of the water flowing to a point of use would be treated at these times. The provision of a fixed restriction in the water feeder line was also objectionable during periods of relatively great demand for treated water inasmuch as it caused an objectionably high pressure drop in the line downstream from the restriction and an entirely inadequate flow of water through the line to the point or points of use.

With these objections in mind, it is the purpose of the present invention to provide a water conditioning device of the character described by which all of the water flowing through the feeder line will be chemically treated regardless of the fact that the demand for treated water may vary widely.

More specifically, it is an object of this invention to provide a water conditioning device of the character described incorporating a flexible restriction which is automatically yieldable to less restrict the feeder line in consequence to a drop in pressure in the feeder line downstream from the restriction brought about by the demand for treated water to assure that the demand for treated water will be met.

Another object of this invention resides in the provision of a water conditioning device of the character described with a shut-off valve which, when closed, not only prevents the flow of water through the chemical pot of the device but also effects drainage of water from the pot so as to conserve the chemicals therein.

With the above and other objects in view which will appear as the description proceeds, this invention resides in the novel construction, combination and arrangement of parts substantially as hereinafter described, and more particularly defined by the appended claim, it being understood that such changes in the precise embodiment of the hereindisclosed invention may be made as come within the scope of the claim.

The accompanying drawing illustrates one complete example of the physical embodiment of the invention constructed in accordance with the best mode so far devised for the practical application of the principles thereof, and in which:

Figure 1 is a side view of a water conditioning device embodying the principles of this invention, portions of the device being shown in elevation and other portions being broken away and shown in longitudinal section;

Figure 2 is a cross sectional view taken through the shut-off valve along the line 2—2 of Figure 1;

Figure 3 is an end view of the fitting or valve body containing the shut-off valve for the device looking from the inlet side of the fitting; and Figure 4 is a perspective view of the flexible flap valve which provides the automatically adjustable restriction in the feeder line, showing the valve assembled with the retaining plug therefor.

In one aspect, the water conditioning device of this invention comprises a receptacle or pot containing water treating chemicals, a fitting carried by the pot to enable the same to be connected in parallel flow relationship with the feeder line through which water to be treated is adapted to flow, and means in said fitting providing a yieldable restriction in the feeder line for assuring that a portion of the water flowing therethrough will be diverted into the receptacle or pot for treatment regardless of the demand for treated water, and without objectionably restricting the flow of water through the feeder line at times of great demand for treated water.

Referring now more particularly to the accompanying drawing in which like numerals indicate like parts throughout the several views, it will be seen that the water conditioning device of this invention comprises an upright cylindrical receptacle or pot 5 adapted to contain a chemical or chemicals 6 for treating the water, and a valve body 7 carried by the pot at the bottom thereof and serving as a fitting to provide for connection of the pot with a water feeder line 8 through which the water to be treated is adapted to flow to one or more points of use. The fitting 7 is somewhat cross-shaped having a main passage 9 therethrough providing by aligning lateral branches 10 and 11. These branches are internally threaded and provide inlet and outlet ports, respectively, for the valve body. The water feeder line 8 is connected with the lateral branches 10 and 11 of the fitting so that the passage 9 thereof serves as a section of the feeder line.

The fitting also has vertically aligned branches 12 and 13 at the top and bottom thereof, respectively. The lower branch 13 of the fitting is closed by a plug 14 threaded thereinto, while the upper branch 12 is provided with a reduced extremity 15 at the top thereof threaded into a hole in the bottom of the receptacle to connect the fitting and receptacle together and to mount the latter on the feeder line 8.

The receptacle is connected in parallel flow relationship with the main passage 9 of the valve body or fitting by means of upright parallel branch passages 17 and 18 extending through the upper branch 12 of the fitting. The axes of these branch passages lie in a plane containing the axis of the passage 9 so that if water flows through the passage 9 from left to right as indicated, the branch passage 17 closest to the upstream end of the passage 9 comprises the inlet for the receptacle, while the branch 18 adjacent to the downstream end of the passage 9 comprises the outlet for the receptacle.

The branch passages 17 and 18 communicate with the interior of the passage 9 through a transverse barrier 20 carried by the upper branch 12 of the fitting and projecting downwardly a slight distance into the passage 9. For this purpose, the barrier is provided with holes 21 and 22 leading horizontally thereinto from its opposite sides and communicating with the lower ends of the branch passages 17 and 18 respectively. Thus, the hole 21 opens toward the upstream end of the passage 9 and provides the mouth of the inlet branch passage 17, while the hole 22 opens toward the downstream end of the passage 9 and provides the discharge end of the outlet branch passage 18.

Water flowing upwardly through the inlet branch passage 17 is dispersed throughout the chemicals in the receptacle by means of an upright dispersing tube 24 threaded into the upper end of the branch passage 17 and rising only a short distance into the lower end portion of the receptacle. This tube has its upper end closed (by means not shown) and has a series of small diameter apertures 25 in its side wall adjacent to the closed upper end to effect dispersion of the water entering the receptacle in all directions into the body of the chemicals contained in the receptacle.

The outlet branch passage 18 likewise has a tube 26 threaded into its upper end. This tube rises throughout the entire body of chemicals in the receptacle and extends to a point adjacent to the top of the receptacle. The upper end of the tube 26 is closed in a manner similar to the tube 24 and likewise has small diameter apertures 27 in its side wall above the level of the chemicals in the receptacle.

Thus, the water entering the receptacle through the inlet branch passage 17 rises in the receptacle until it reaches the level of the upper end of the discharge tube 26 and is returned to the downstream end of the passage 9 by means of the discharge tube 26 and the outlet branch passage 18. By reason of the passage of water through the body of chemicals in the receptacle some of the chemicals will be absorbed by the water and the chemicals thus in solution are transferred to the water flowing through the passage 9 of the valve body or fitting to chemically treat the same.

In order that the pot or receptacle 5 may be recharged with chemicals from time to time as the same become depleted, the pot is provided with a removable cover 29 at its upper end. In the present instance, the cover is shown as having a screw threaded connection with the receptacle and this connection is rendered water tight by means of a gasket in the usual manner, although other types of covers may be employed to equal advantage.

As stated previously, the barrier 20 projects only a slight distance into the passage 9, so that it has very little restricting effect upon the passage. According to this invention, the passage 9 has an automatically adjustable restriction which is provided by a rubber flap valve 31. This valve is preferably made of a rectangular sheet of rubber having good resilient and flexible characteristics so as to be responsive to pressure at opposite sides thereof.

The flap valve 31, as stated, has a substantially flat rectangular shape, but at its bottom end it is provided with an enlarged cylindrical bead 32 which is received in a transverse aperture 33 in the inner end of the plug 14 which closes the lower branch 13 of the fitting 7. The aperture 33, of course, opens to the inner extremity of the plug through a reduced slot 34 just wide enough to accommodate the flat portion of the flap valve adjacent to the bead 32 thereon.

Thus, the flap valve 31 is conveniently held by the plug 14 in a position extending upright and transversely across the passage 9 of the fitting medially of the ends thereof, and with the flap valve nearly closing the passage 9. Stated in another way, it is essential that the upper end of the flap valve terminate only a slight distance from the underside of the barrier 20 and that the side edges of the flap valve conform somewhat closely to the shape of the side walls which define the passage 9 in the fitting. Hence, the flap valve defines an inlet chamber 36 at its upstream side and an outlet chamber 37 at its downstream side.

With this construction the flap valve restricts the passage 9, at times of little demand for treated water, a degree such as to cause a slightly higher pressure in the inlet chamber 36 of the passage than in the outlet chamber 37. Because of this pressure differential some of the water in the inlet chamber, being at a higher pressure, is diverted upwardly through the inlet branch passage 17 and into the chemical pot 5 to be returned to the outlet chamber 37 through the outlet branch duct 18 for treatment of the water which has by-passed the chemical pot and the flap valve 31.

It will be seen, therefore, that even though the pressure in the inlet chamber 36 may be only slightly higher than the pressure in chamber 37 at times when only slight amounts of treated water are demanded, the flap valve assures circulation of part of the water from the feeder line through the chemical pot.

At times when there is a relatively great demand for treated water, the pressure in the outlet chamber 37 at the downstream side of the flap valve is greatly reduced and the force of water entering the inlet chamber 36 acts upon the flap valve 31 to bend the same in the downstream direction as indicated in dotted lines in Figure 1 to a position less restricting the flow of water through the passage 9. This assures against an objectionably high pressure drop in the feeder line, downstream from the conditioning device, while at the same time assuring that there will always be sufficient pressure differential between the inlet and outlet chambers as to cause diversion of the water upwardly through the inlet branch passage 17 and through the chemical pot.

Consequently, it will be seen that the flap valve 31 is entirely pressure responsive and that it will automatically yield in proportion to the pressure differential at opposite sides thereof and adjust itself to positions less restricting the passage 9 in accordance with an increasing demand for treated water. In other words, the flap valve yields an amount directly proportional to the demand for treated water to enable the demand to be met by the device.

In order that the clinical pot may be entirely sut off from the feeder line, the valve body 7 is provided with a shut-off valve generally designated 39, by which communication between the interior of the chemical pot and the passage 9 may be controlled. This valve is incorporated in the upper branch 12 of the fitting 7, and comprises a frusto-conical plug 40 rotatably received in a similarly shaped bore transversely through the branch 12 of the fitting and intersecting both branch passages 17 and 18. The plug is maintained assembled with the fitting by means of a nut 41 received on a threaded extension of the plug at the small diameter end thereof.

The plug, of course, is provided with transverse holes 42 and 43 therethrough which align with the inlet and outlet branches 17 and 18 respectively in the open position of the valve. Hence the interior of the receptacle may be shut off from the passage 9 of the fitting merely by rotating the valve plug approximately 90° in a clockwise direction as viewed in Figure 3.

In addition to controlling communication between interior of the chemical pot and the passage 9, the valve 39 serves an additional function, which is that of venting the interior of the pot at times when the valve is turned to its closed position. For this purpose the plug 40 has a small diameter hole 45 drilled longitudinally into its large diameter end eccentric to the axis of the plug and this hole extends alongside and terminates adjacent to the aperture 42 in the plug. The inner end of the aperture 45 connects with a radial hole 46 drilled into the side of the plug on an axis generally transverse to the axis of the hole 42 and communicates the upper portion of the branch passage 17 with the vent hole 45 in the closed position of the plug. Thus, whenever the valve is actuated to its closed position not only is the pressure relieved from the interior of the chemical pot 5 but the water therein is drained out through the vent arrangement described to avoid waste of chemicals in the pot.

From the foregoing description, it will be apparent to those skilled in the art that this invention provides an improved water conditioning device which will assure chemical treatment of all the water flowing through the feeder line with which the device is associated, and that the yieldable restriction incorporated in the device will not interfere with the delivery of the right amounts of treated water at periods of great demand on the conditioner.

What I claim as my invention is:

A water conditioning device wherein a receptacle for holding a supply of conditioning chemicals is communicated with a feeder line for water to be treated through a hollow fitting having a main passage connectable in the feeder line and having duct means including an inlet and an outlet branch passage each communicating the interior of said receptacle with said main passage, and wherein the main passage is provided with a restriction between the points of its communication with the inlet and outlet branch passages to cause water to be diverted from the main passage into the inlet branch passage, said hollow fitting being characterized by the provision of a bore intersecting both of the inlet and outlet branch passages and extending to the exterior of the hollow fitting; a valve plug rotatably mounted in said bore with one end thereof exposed at the exterior of the fitting and having a pair of ports extending diametrically therethrough in line with the branch passages to either open or close the same depending upon the position of the plug, said plug being provided with a vent passage extending longitudinally inwardly from the exposed end of the plug with its inner end opening to the side of the plug on the transverse plane containing the axis of one of its ports at a point circumferentially spaced from the ends of said port so that in one position of rotation of the plug the inner end of the vent passage communicates with the adjacent branch passage to vent the interior of the receptacle and enable water to drain therefrom.

VERNON J. PALMER.

REFERENCES CITED

The following references are of record in the file of this patent:

UNITED STATES PATENTS

| Number | Name | Date |
|---|---|---|
| 423,773 | Jewell | Mar. 18, 1890 |
| 440,162 | Jewell | Nov. 11, 1890 |
| 1,650,829 | Grant | Nov. 29, 1927 |
| 1,710,301 | Earl | Apr. 23, 1929 |
| 1,855,323 | Sirch | Apr. 26, 1932 |
| 1,946,476 | Banks et al. | Feb. 13, 1934 |
| 1,948,971 | Meyer | Feb. 27, 1934 |
| 2,137,755 | Glynn | Nov. 22, 1938 |
| 2,142,947 | Kretzschmar et al. | Jan. 9, 1939 |
| 2,255,324 | McGill | Sept. 9, 1941 |
| 2,489,932 | Rosenblum | Nov. 29, 1949 |
| 2,521,802 | Otto | Sept. 12, 1950 |

FOREIGN PATENTS

| Number | Country | Date |
|---|---|---|
| 260,279 | Germany | May 23, 1913 |